(12) United States Patent
Paknad et al.

(10) Patent No.: US 8,204,869 B2
(45) Date of Patent: Jun. 19, 2012

(54) METHOD AND APPARATUS TO DEFINE AND JUSTIFY POLICY REQUIREMENTS USING A LEGAL REFERENCE LIBRARY

(75) Inventors: Deidre Paknad, Palo Alto, CA (US); Pierre Raynaud-Richard, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 12/242,423

(22) Filed: Sep. 30, 2008

(65) Prior Publication Data

US 2010/0082676 A1  Apr. 1, 2010

(51) Int. Cl.
*G06F 17/00* (2006.01)
*G06F 7/00* (2006.01)

(52) U.S. Cl. ......... 707/694; 707/778; 707/919; 707/942

(58) Field of Classification Search .................. None
See application file for complete search history.

(56) References Cited

U.S. PATENT DOCUMENTS

| | | |
|---|---|---|
| 5,355,497 A | 10/1994 | Cohen-Levy |
| 5,608,865 A | 3/1997 | Midgely et al. |
| 5,701,472 A | 12/1997 | Koerber et al. |
| 5,903,879 A | 5/1999 | Mitchell |
| 6,115,642 A | 9/2000 | Brown et al. |
| 6,128,620 A | 10/2000 | Pissanos et al. |
| 6,151,031 A | 11/2000 | Atkins et al. |
| 6,173,270 B1 | 1/2001 | Cristofich et al. |
| 6,330,572 B1 | 12/2001 | Sitka |
| 6,332,125 B1 | 12/2001 | Callen et al. |
| 6,343,287 B1 | 1/2002 | Kumar et al. |
| 6,401,079 B1 | 6/2002 | Kahn et al. |
| 6,425,764 B1 | 7/2002 | Lamson |
| 6,539,379 B1 | 3/2003 | Vora et al. |
| 6,607,389 B2 | 8/2003 | Genevie |
| 6,622,128 B1 | 9/2003 | Bedell et al. |
| 6,738,760 B1 | 5/2004 | Krachman |
| 6,805,351 B2 | 10/2004 | Nelson |
| 6,832,205 B1 | 12/2004 | Aragones et al. |
| 6,839,682 B1 | 1/2005 | Blume et al. |
| 6,944,597 B2 | 9/2005 | Callen et al. |
| 6,976,083 B1 | 12/2005 | Baskey et al. |
| 7,076,439 B1 | 7/2006 | Jaggi |
| 7,103,602 B2 | 9/2006 | Black et al. |
| 7,104,416 B2 | 9/2006 | Gasco et al. |
| 7,107,416 B2 | 9/2006 | Stuart et al. |
| 7,127,470 B2 | 10/2006 | Takeya |
| 7,162,427 B1* | 1/2007 | Myrick et al. ................ 705/348 |
| 7,197,716 B2 | 3/2007 | Newell |

(Continued)

OTHER PUBLICATIONS

Human Capital Mangement; "mySAP . . . management"; retrieved from archive.org Aug. 18, 2009 www.sap.com.

(Continued)

*Primary Examiner* — Greta L Robinson
*Assistant Examiner* — James J Wilcox
(74) *Attorney, Agent, or Firm* — Shumaker & Sieffert, P.A.

(57) ABSTRACT

A computer-implemented system and method for defining and justifying policy requirements includes: a hierarchical regional mapping (HRM) module provides a common language and a hierarchical model for geography and for jurisdictions; a legal references library (LRL) module contains applicable legal references; a legal references policy mapping (LRPM) module maps legal references to policies; and a requirements cross-checking (RCC) module cross-checks information in the legal references policy mapping module.

16 Claims, 5 Drawing Sheets

U.S. PATENT DOCUMENTS

| | | |
|---|---|---|
| 7,225,249 B1 | 5/2007 | Barry et al. |
| 7,281,084 B1 | 10/2007 | Todd et al. |
| 7,283,985 B2 | 10/2007 | Schauerte et al. |
| 7,284,985 B2 | 10/2007 | Genevie |
| 7,333,989 B1 | 2/2008 | Sameshima et al. |
| 7,386,468 B2 | 6/2008 | Calderaro et al. |
| 7,433,832 B1 | 10/2008 | Bezos et al. |
| 7,478,096 B2 | 1/2009 | Margolus et al. |
| 7,502,891 B2 | 3/2009 | Shachor |
| 7,512,636 B2 | 3/2009 | Verma et al. |
| 7,558,853 B2 | 7/2009 | Alcorn et al. |
| 7,580,961 B2 | 8/2009 | Todd et al. |
| 7,594,082 B1 | 9/2009 | Kilday et al. |
| 7,596,541 B2 | 9/2009 | deVries et al. |
| 7,653,893 B2* | 1/2010 | Neumann et al. ............ 717/101 |
| 7,720,825 B2 | 5/2010 | Pelletier et al. |
| 7,730,148 B1 | 6/2010 | Mace et al. |
| 7,895,229 B1 | 2/2011 | Paknad |
| 2001/0053967 A1 | 12/2001 | Gordon et al. |
| 2002/0007333 A1 | 1/2002 | Scolnik et al. |
| 2002/0010708 A1 | 1/2002 | McIntosh |
| 2002/0022982 A1 | 2/2002 | Cooperstone et al. |
| 2002/0035480 A1 | 3/2002 | Gordon et al. |
| 2002/0083090 A1 | 6/2002 | Jeffrey et al. |
| 2002/0091553 A1 | 7/2002 | Callen et al. |
| 2002/0095416 A1 | 7/2002 | Schwols |
| 2002/0103680 A1 | 8/2002 | Newman |
| 2002/0108104 A1 | 8/2002 | Song et al. |
| 2002/0119433 A1 | 8/2002 | Callender |
| 2002/0120859 A1 | 8/2002 | Lipkin et al. |
| 2002/0123902 A1 | 9/2002 | Lenore et al. |
| 2002/0143595 A1 | 10/2002 | Frank et al. |
| 2002/0143735 A1 | 10/2002 | Ayi et al. |
| 2002/0147801 A1 | 10/2002 | Gullotta et al. |
| 2002/0162053 A1 | 10/2002 | Os |
| 2002/0178138 A1 | 11/2002 | Ender et al. |
| 2002/0184068 A1 | 12/2002 | Krishnan et al. |
| 2002/0184148 A1 | 12/2002 | Kahn et al. |
| 2003/0004985 A1 | 1/2003 | Kagimasa et al. |
| 2003/0014386 A1 | 1/2003 | Jurado |
| 2003/0018520 A1 | 1/2003 | Rosenfeld et al. |
| 2003/0031991 A1 | 2/2003 | Genevie |
| 2003/0033295 A1 | 2/2003 | Adler et al. |
| 2003/0036994 A1 | 2/2003 | Witzig et al. |
| 2003/0046287 A1 | 3/2003 | Joe |
| 2003/0051144 A1 | 3/2003 | Williams |
| 2003/0069839 A1 | 4/2003 | Whittington et al. |
| 2003/0074354 A1 | 4/2003 | Lee et al. |
| 2003/0097342 A1 | 5/2003 | Whittingtom |
| 2003/0110228 A1 | 6/2003 | Xu et al. |
| 2003/0139827 A1* | 7/2003 | Phelps ............................. 700/36 |
| 2003/0229522 A1 | 12/2003 | Thompson et al. |
| 2004/0002044 A1 | 1/2004 | Genevie |
| 2004/0019496 A1 | 1/2004 | Angle et al. |
| 2004/0034659 A1 | 2/2004 | Steger |
| 2004/0060063 A1 | 3/2004 | Russ et al. |
| 2004/0068432 A1 | 4/2004 | Meyerkopf et al. |
| 2004/0088283 A1 | 5/2004 | Lissar et al. |
| 2004/0088332 A1 | 5/2004 | Lee et al. |
| 2004/0088729 A1 | 5/2004 | Petrovic et al. |
| 2004/0103284 A1 | 5/2004 | Barker |
| 2004/0133573 A1 | 7/2004 | Miloushev et al. |
| 2004/0138903 A1 | 7/2004 | Zuniga |
| 2004/0143444 A1 | 7/2004 | Opsitnick et al. |
| 2004/0187164 A1 | 9/2004 | Kandasamy et al. |
| 2004/0193703 A1 | 9/2004 | Loewy et al. |
| 2004/0204947 A1 | 10/2004 | Li et al. |
| 2004/0215619 A1 | 10/2004 | Rabold |
| 2004/0260569 A1 | 12/2004 | Bell et al. |
| 2005/0060175 A1 | 3/2005 | Farber et al. |
| 2005/0071251 A1 | 3/2005 | Linden et al. |
| 2005/0074734 A1 | 4/2005 | Randhawa |
| 2005/0091076 A1* | 4/2005 | McGovern ........................ 705/1 |
| 2005/0114241 A1 | 5/2005 | Hirsch et al. |
| 2005/0144114 A1* | 6/2005 | Ruggieri et al. ................ 705/37 |
| 2005/0165734 A1 | 7/2005 | Vicars et al. |
| 2005/0187813 A1 | 8/2005 | Genevie |
| 2005/0203821 A1 | 9/2005 | Petersen et al. |
| 2006/0036464 A1 | 2/2006 | Cahoy et al. |
| 2006/0036649 A1 | 2/2006 | Simske et al. |
| 2006/0074793 A1 | 4/2006 | Hibbert et al. |
| 2006/0095421 A1 | 5/2006 | Nagai et al. |
| 2006/0126657 A1 | 6/2006 | Beisiegel et al. |
| 2006/0136435 A1 | 6/2006 | Nguyen et al. |
| 2006/0143248 A1 | 6/2006 | Nakano et al. |
| 2006/0149735 A1 | 7/2006 | DeBie et al. |
| 2006/0156381 A1 | 7/2006 | Motoyama |
| 2006/0167704 A1 | 7/2006 | Nicholls et al. |
| 2006/0174320 A1* | 8/2006 | Maru et al. ........................ 726/1 |
| 2006/0184718 A1 | 8/2006 | Sinclair |
| 2006/0229999 A1 | 10/2006 | Dodell et al. |
| 2006/0230044 A1 | 10/2006 | Utiger |
| 2007/0016546 A1 | 1/2007 | DeVorchik et al. |
| 2007/0048720 A1 | 3/2007 | Billauer |
| 2007/0061156 A1 | 3/2007 | Fry et al. |
| 2007/0061157 A1 | 3/2007 | Fry et al. |
| 2007/0078900 A1 | 4/2007 | Donahue |
| 2007/0099162 A1 | 5/2007 | Sekhar |
| 2007/0100857 A1 | 5/2007 | DeGrande et al. |
| 2007/0112783 A1 | 5/2007 | McCreight et al. |
| 2007/0156418 A1 | 7/2007 | Richter et al. |
| 2007/0162417 A1 | 7/2007 | Cozianu et al. |
| 2007/0208690 A1 | 9/2007 | Schneider et al. |
| 2007/0219844 A1 | 9/2007 | Santorine et al. |
| 2007/0220435 A1 | 9/2007 | Sriprakash et al. |
| 2007/0271517 A1 | 11/2007 | Finkelman et al. |
| 2007/0282652 A1* | 12/2007 | Childress et al. ................. 705/8 |
| 2007/0288659 A1 | 12/2007 | Zakarian et al. |
| 2008/0033904 A1 | 2/2008 | Ghielmetti et al. |
| 2008/0034003 A1 | 2/2008 | Stakutis et al. |
| 2008/0059265 A1 | 3/2008 | Biazetti et al. |
| 2008/0059543 A1 | 3/2008 | Engel |
| 2008/0070206 A1 | 3/2008 | Perilli |
| 2008/0148346 A1* | 6/2008 | Gill et al. ........................ 726/1 |
| 2008/0195597 A1 | 8/2008 | Rosenfeld et al. |
| 2008/0229037 A1 | 9/2008 | Bunte et al. |
| 2008/0294674 A1 | 11/2008 | Reztlaff et al. |
| 2008/0301207 A1 | 12/2008 | Demarest et al. |
| 2008/0319958 A1 | 12/2008 | Bhattacharya et al. |
| 2008/0319984 A1 | 12/2008 | Proscia et al. |
| 2009/0037376 A1 | 2/2009 | Archer et al. |
| 2009/0043625 A1 | 2/2009 | Yao |
| 2009/0106815 A1* | 4/2009 | Brodie et al. .................... 726/1 |
| 2009/0119677 A1 | 5/2009 | Stefansson et al. |
| 2009/0150866 A1 | 6/2009 | Schmidt |
| 2009/0150906 A1 | 6/2009 | Schmidt et al. |
| 2009/0193210 A1 | 7/2009 | Hewett et al. |
| 2009/0307743 A1* | 12/2009 | Azagury et al. .................. 726/1 |
| 2010/0070315 A1 | 3/2010 | Lu et al. |
| 2010/0094766 A1* | 4/2010 | Li et al. ........................ 705/322 |

OTHER PUBLICATIONS www.pss-systems.com; retrieved from www.Archive.org any linkage dated Dec. 8, 2005, 131 pages.

PSS Systems, Inc., Atlas LCC for Litigation, pp. 1-2, www.pss-systems.com (Feb. 2008); PSS Systems, Inc., Map Your Data Sources, www.pss-systems.com (Feb. 200*); PSS Systems, Inc., "PSS Systems Provides Legal Hold and Retention Enforcement Automation Solutions for File Shares, Documentum, and other Data Sources" (Feb. 2008).

PSS Systems, Inc., Preservation Benchmarks for 2007 and Beyond, www.pss-systems.com, pp. 1-3 (2007).

PSS Systems, Inc., "Industry Leader PSS Systems Launches Third Generation of Atlas Legal Hold and Retention Management Software", pp. 1-2, www.pss-systems.com (Aug. 2007).

PSS Systems, Inc., Litigation Communications and Collections, www.pss-systems.com (2006), retrieved online on Dec. 8, 2010 from archive.org, 1 page.

Zhu, et al.; "Query Expansion Using Web Access Log Files"; Lecture Notes in Computer Science, 2005, vol. 3588/2005, pp. 686-695, Springer-Verlag Berlin Hedelberg.

* cited by examiner

METHOD AND APPARATUS TO DEFINE AND JUSTIFY POLICY REQUIREMENTS USING A LEGAL REFERENCE LIBRARY

BACKGROUND OF THE INVENTION

1. Field of the Invention

This invention relates to methods and apparatus using software for governance of organization policies.

2. Prior Art

Previously, data for policy governance was usually maintained using spreadsheets, in which legal references relating to policies were by name and which quickly got out of date. More complete libraries of legal references were available but were focused only on managing those legal references and are not focused on policy development, policy cross references, or analysis. Also, they usually contain a large subset of all legal references applicable in a large jurisdiction, and are not tuned, formatted or tagged to reflect the need of corporations, but instead reflect the needs of the law services consulting companies that provide services to these corporations. Codification of jurisdictional coverage is often different between publishers of legal references and legal consultants. Organizations and companies are often left with their own resources to derive policies in an ad-hoc manner, which often results in partial, inefficient, or unreliable execution of legal processes. This puts an organization at greater risk of being unable to justify their policies when challenged so that they may incur fines, penalties, reprimands, or other public relationship embarrassments, all of which can seriously impact company business.

SUMMARY OF THE INVENTION

The present invention reduces the risk and costs associated with the definition, justification and defense of any company policies based on legal references provided by any law, rule, guideline, or other legal requirement. First, it enables a more thorough, quicker, and cheaper process to identify relevant legal references by matching related geographic areas of application. Second, it greatly simplifies the process of identifying potentially conflicting or disparate requirements from different legal references in order to facilitate the decision process regarding which requirements should be explicitly followed. Third, it provides more robust documentation and tracking of the decisions that were made, and can assist in preventing and detecting inconsistencies or human errors during that process. As a result, any organization taking advantage of the present invention will benefit from having a cheaper, faster, and more reliable process to define and maintain policies requirements, which in turn decrease exposure from non-compliance. The present invention also provides more consistent and defensible documentation for the justification for policies and significantly reduces risk in case of legal challenges to those policies.

The present invention provides a computer-implemented system and method for defining and justifying policy requirements. A hierarchical regional mapping (HRM) module provides a common language and a hierarchical model for geography and for jurisdictions. A legal references library (LRL) module contains applicable legal references. A legal references policy mapping (LRPM) module maps legal references to policies. A requirements cross-checking (RCC) module cross-checks information in the legal references policy mapping module.

According to various aspects of the invention, the legal references policy mapping (LRPM) module: provides for creating and maintaining a list of legal references that apply to a given policy; provides for identifying which type of requirement for a given policy is influenced by a given legal references; and provides which of the legal references are to be controlling for a given policy.

According to various other aspects of the invention, the requirements cross-checking (RCC) module provides for creating and maintaining a model of the dependencies and compatibility between structured parameters used to describe each category of requirements; provides, within each category of requirements, consolidation of all controlling requirements and comparison of them to a policy requirement using an understanding of the relationships between parameters and options; provides, within each category of requirements, consolidation of the sum of all requirements to allow easy review and evaluation of the compromises that were made between the policy requirement and the sum of all requirements that were applicable; and provides cross-checking of a geographic region and jurisdiction associated with a policy and its related legal references to detect inconsistency that would uncover human error.

According to various other aspects of the invention, the hierarchical regional mapping (HRM) module provides representation of the different jurisdictions and sub-jurisdictions that an organization operates in and representation of regulatory or governing bodies within the different jurisdictions; and provides an explicit naming/referencing scheme in which nodes are specified by a hierarchical path.

According to various other aspects of the invention, the legal references library (LRL) module provides for each legal reference a geographic region or jurisdiction that the reference applies to as defined by one or more nodes within a hierarchy defined by the HRM module; and provides for each reference a classification tag that reflects the source of a requirement and the domain of application of the requirements within the organization.

According to various other aspects of the invention the domain of application includes one or more of the following: preservation requirements, retention, data privacy, or security designations.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENT

Reference is now made in detail to preferred embodiments of the invention, examples of which are illustrated in the accompanying drawings. While the invention is described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

In the current global economy, any organization, enterprise, public agency, etc.—herein after referred to as "the company"—must define, justify, implement and insure compliance with a broad range of policies. Depending on its size, its scope of activity, and the different jurisdictions that it operates in, the company may need to define thousands, if not tens of thousands, of different instances of policies. Some of these policies are likely to be challenged by other parties, either regulators, government agencies, shareholders, current and past employees, or other third parties. It is in the best interest of the company to use a precise, efficient, and defensible process to define and justify its policies. This process should fulfill several needs. One need is to document those legal references that are used as references or sources for justifying a policy. Note that in this context, "legal reference" is used as a generic term to encompass any law texts, opinions on law texts, other internal company protocols or practices, or any other reference used to justify some or all aspects of a policy. The process should help to quickly identify which legal references are relevant to a specific policy. The process should document which aspect of a policy is governed by specific related legal references. The process should document which specific legal references that the company selects as governing in those cases where the requirements of different legal references are conflicting or open to various interpretations. The process should proactively detect potential inconsistencies or other human errors when compiling legal requirements into policy requirements. The present invention provides a process and a computer-implemented software tool for enabling and supporting the efficient and reliable execution of this process.

Figure 1:
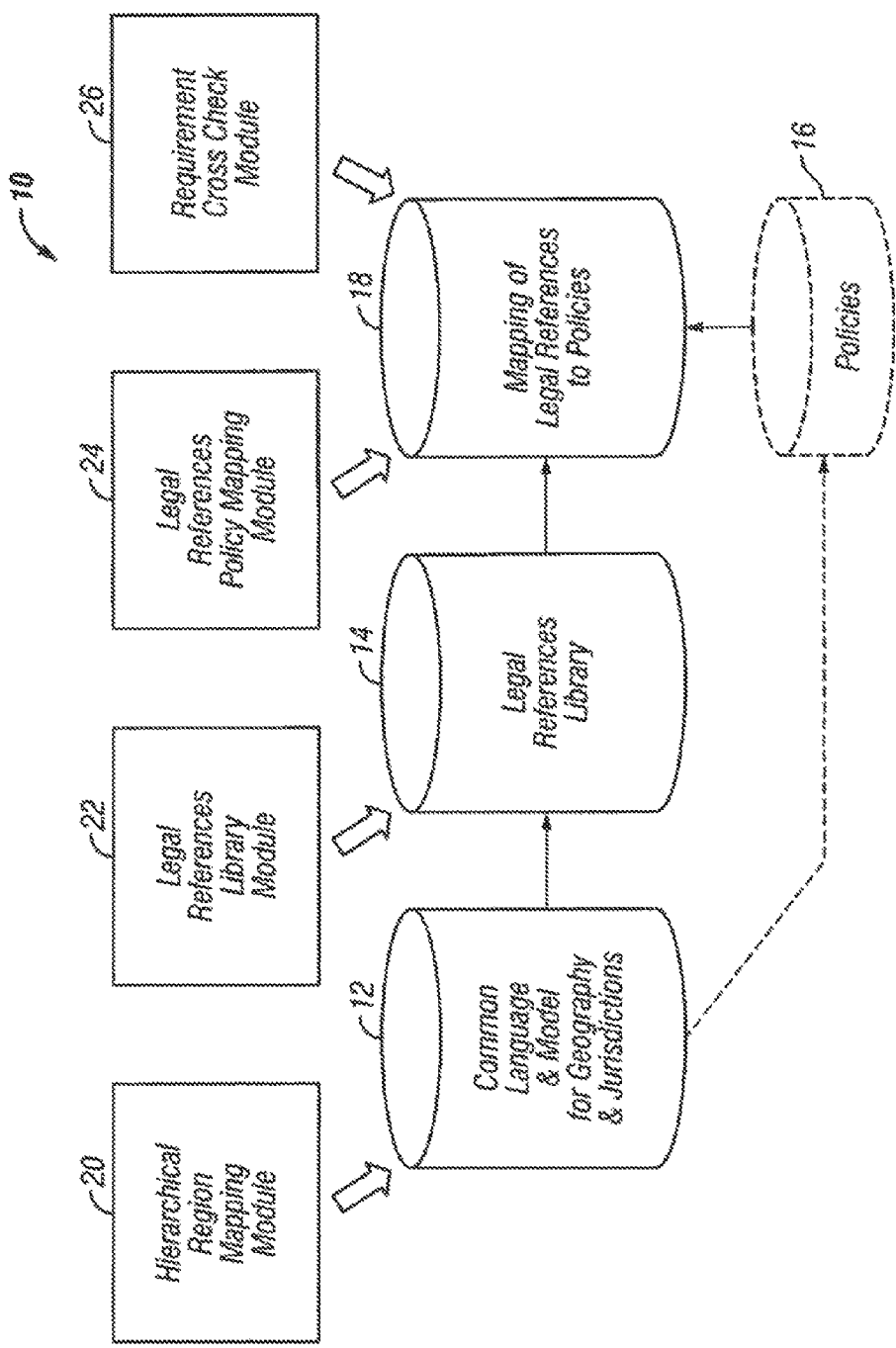
FIG. 1 is an overall system diagram illustrating a system for defining and justifying policy requirements using a legal reference library.

FIG. 1 shows an overview of a system 10 and a process for defining and justifying policy requirements. The system 10 and process has four different data units that represent data created by four modules. A common language/jurisdiction data unit 12 provides information to a legal references library data unit 14 and to a policies data unit 16. A mapping data unit 18 maps legal references to policies. The common language/jurisdiction data unit 12 provides for the creation and maintenance of a common language and also provides a model to describe geographical areas of application for legal references and policies.

The four modules includes a hierarchical region mapping module (HRM) 20 defines a common hierarchy of jurisdiction or other geographic areas that are used to define the scope of application of all legal references and policies. A legal reference library module (LRL) 22 captures, manages, and maintains the definitions of all legal references that the company may need to refer to in order to define and justify its policies. A legal reference to policy mapping module (LRPM) 24 is used to define the relationship between any policy and its related legal references. A requirement cross check module (RCC) 26 performs cross check validation of the requirements defined in all related legal references against the requirements defined in the policy that they are related to, with the purpose of detecting inconsistency and minimizing errors. Some of the validations are performed automatically, others are assisted by the tool but may require human judgment to complete the validation. Validation includes change management and analytics as well as audits.

Laws and regulations apply only within the jurisdiction of the agency or governing body that has defined them, for example, all countries of the European Union, a specific country, or a specific U.S. state. Similarly, policies usually apply only within a specific geographical region, country, state, or some arbitrary region defined by the company, such as, for example, "North East Asia". To insure that policies and legal references are properly defined and to insure that proper legal references are used to justify their matching policies, it is very important to make sure their geographical regions of application are consistent. It is difficult to do that if the scopes of application are defined using different terminology. The hierarchical region mapping module (HRM) 20 unifies them into a single hierarchy of all applicable "geographic" regions, either jurisdiction-based or geography-based, in the common language/jurisdiction data unit 12. The hierarchical region mapping module (HRM) makes comparisons and validation easy and reliable.

The legal references library LRL module 22 provides creation, management, and maintenance of a legal reference data library 14, or of a list of legal references, that contains all applicable legal references. This library allows user to define and track the legal references and some of the key properties of those legal references. One property is the geographic area of application, based on a defined model. Another property is the use of structured definitions of legal reference requirements. In this context, a structured definition is used in the sense of a definition whose semantic meaning can be understood by a software application as the sum of fields, numeric values, options, and other codified semantic information that can be compared, ordered, or otherwise automatically processed by a software application. This is in contrast to a human readable description, such as, for example, free form text using English sentences, which are easily understood by a person but have no meaning for a software application. Links are provided to other related legal references that define similar requirements in the same or related geographic area of application.

The Legal References Policy Mapping (LRPM) module 24 defines, manages, and maintains a mapping between legal references and policies in the mapping and legal references data unit 18, while tracking specific properties. One property includes geographic areas of application of the policies, based on the above defined model. Another property is the definition of the applicable requirements such that a related legal reference may define a broad set of requirements, but when applied to a specific policy, only certain of these requirements will truly apply in the context of that policy. Another property is the definition of the governing requirements, also called "trumping legal references." Out of all the applicable requirements defined by the combined related legal references, some may conflict and some may be judged as being too constraining or less applicable. Consequently the policy requirement are based on only a subset of all applicable requirements called the governing requirements of the governing legal references, while the other requirements are tracked for reference, but are trumped, so to speak, by the governing requirements.

The Requirement Cross Check (RCC) module 26 provides for cross-checking and validation of all applicable and governing requirements from related legal references against the requirement of their matching policy, to insure consistency and detect any human errors. This module also provides for change control throughout the process to deal with changes. These changes include a number of aspects, including: creation or removal of legal references, from either the library, the policies, or the process; replacing an existing legal reference by a new legal reference; changes to the definition of a legal reference, including any requirement or its geographic area of application; changes to a geographic area of policy application, including any refinement or further breakdown of existing policy in more specific geographic areas of application, such as, for example, breakdown down of U.S. federal policy into U.S. states policies; and changes to the trumping legal references.

Hierarchical Region Mapping Module (HRM)

Figure 2:
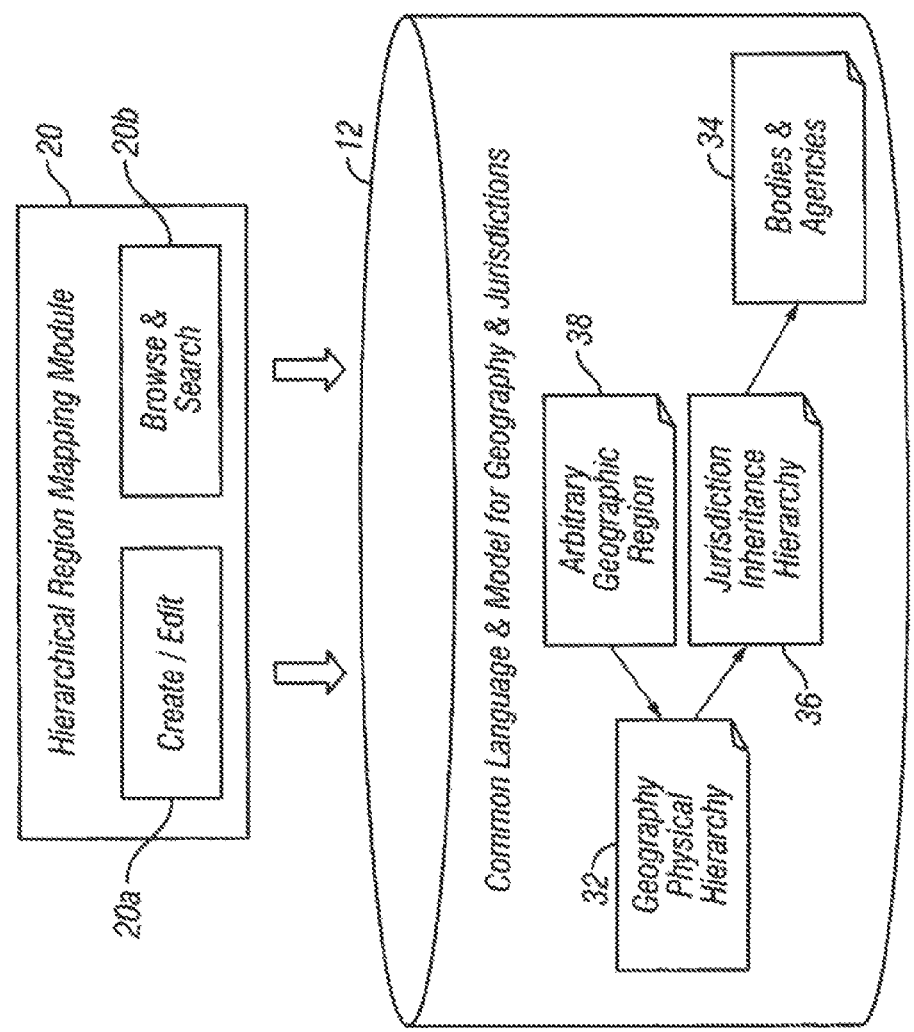
FIG. 2 is a diagram illustrating a hierarchical regional mapping module (HRM) and its interaction with a module for a common language and a model for geography and jurisdictions.

With reference to FIG. 2, the hierarchical region mapping module (HRM) 20 provides the ability to create and maintain a single common hierarchy of geographies and jurisdictions using a create/edit function 20a. The HRM module 20 also includes a browse and search function 20b. The HRM module 20 represents all of the different jurisdictions 32 in which the company operates, including, but not limited to, countries, sub-region within countries (like US states), sub-regions within the sub-region (like US counties), any further sub level as appropriate (sub-sub-sub-region, etc.), or any level of macro-jurisdiction as federation of countries (like the European Union) based on international treaties. The HRM module 20 represents all regulatory or governing body or agencies 34 that control laws or regulations in those jurisdictions.

The HRM module 20 provides the semantics of jurisdiction inheritance that makes it possible to determine a list of all jurisdictions within which the laws for that jurisdiction apply. For example, laws published by a European EU agency are defined in the jurisdiction of the EU, and consequently apply (under the proper treaty) in any EU country and any sub-jurisdiction within any of those countries. As another example, U.S. federal laws by default apply to all U.S. states and to all U.S. counties.

The HRM module 20 represents any arbitrary geographic region 38 defined as the union of multiple existing geographic regions or jurisdictions, or a sub-region of an existing geographic region or jurisdiction. These geographic regions are typically be specific to the business of the company and reflect the fundamental organization of the activity of the company, in different sales regions, or any other business driven geography. For example, the company may have divided their US sales into a few regions like: "East Coast," "West Coast" and "Central". Such regions are typically defined as a specific list of U.S. states. As another example, the company may have divided its worldwide sales activity into regions, one of them being "North East Asia," defined as a list of countries in North East Asia, such as, for example, Japan, South Korea, and Taiwan. The company may not track jurisdiction at a granularity smaller than the state of California, but it may have different branches or sales organization in 3 sub-division of California such as "South", "Central", and "North".

The HRM module 20 provides an explicit naming/referencing scheme so that each node in the hierarchy is named or referenced as a unique node by specifying a complete hierarchical path, starting with a country, or a geographical region or jurisdiction equivalent to the union of multiple countries.

The HRM module 20 insures that all other modules are able to describe where policies and their justifications apply in a fully consistent manner, worldwide, for any type of policy that is either driven by external governing agencies or that is driven by internal company business drivers.

Legal Reference Library Module (LRL)

Figure 3:
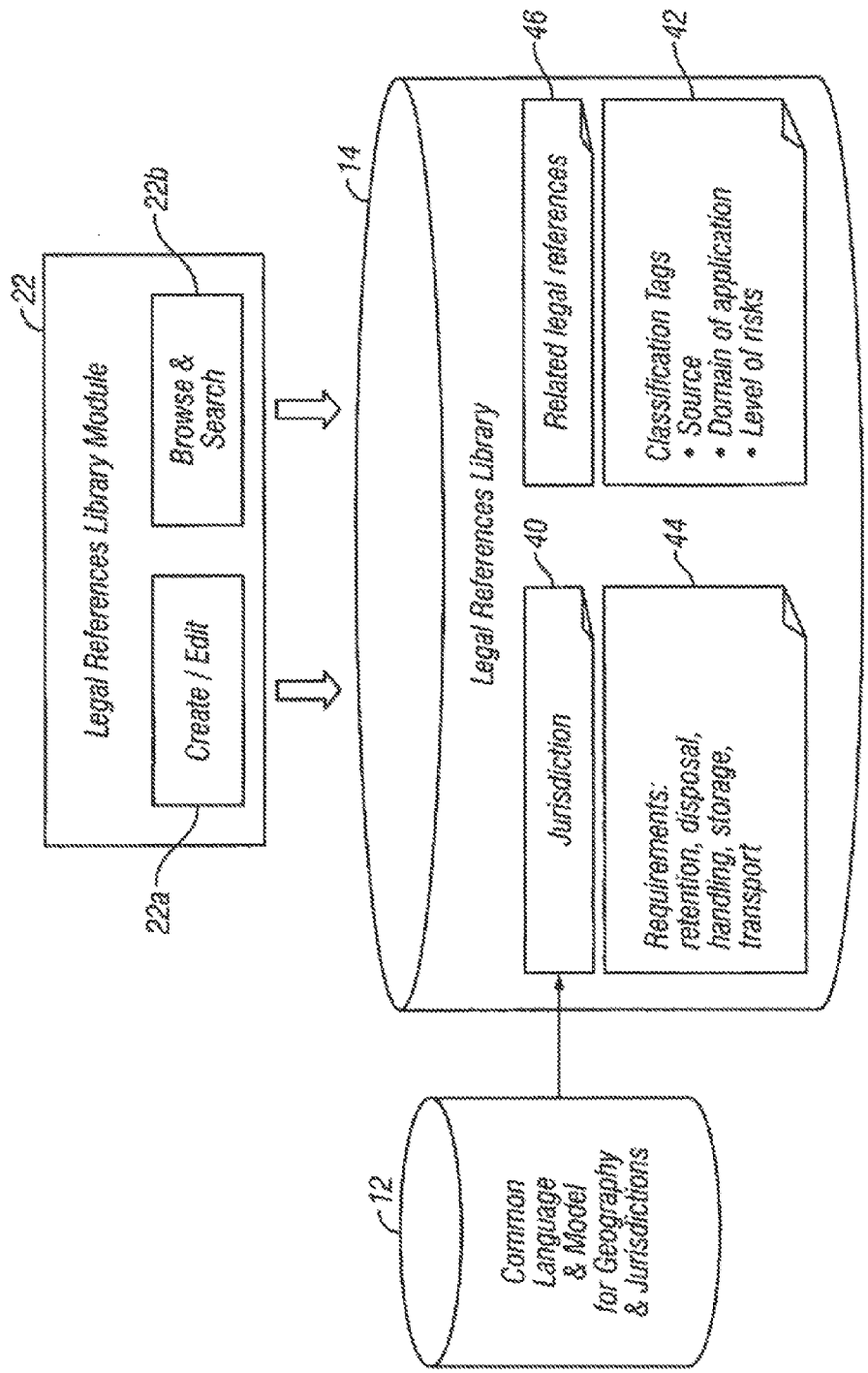
FIG. 3 is a diagram illustrating a legal reference library module (LRL) and its interaction with a legal reference module.

With reference to FIG. 3, the legal reference library 14 provides a central common repository for all legal references that may be relevant to define, support, relate to, or justify any company policy, process, or practice. The LRL module 22 tracks the various properties for each legal reference. One property includes the geographic region or jurisdiction that a legal reference applies to, where the geographic region or jurisdiction is defined as one node or multiple nodes within the hierarchy defined by the HRM module 20. By leveraging the unified hierarchy provided by the HRM 20, the LRL 22 makes it easy to identify any applicable legal references for any given region or jurisdiction without any of the usual confusion or uncertainty encountered with usual systems where legal references are kept in different repository, using a different geographic hierarchy. The residence of the data or individual can be used to determine the geography and therefore an applicable legal reference and policy.

Classification tags are provided that reflects different fundamental aspects of a legal reference and that include: the category for the source of a requirement, including but not limited to laws or regulations from regulatory or governing bodies and agencies; opinions that are interpretation of laws or regulations from legal experts based on case law or other legal analysis; and internal protocols, or internal requirements defined within the company itself, that behaves as internal laws of the company.

While in common cases legal reference usually belong only to a single category of sources of requirements because they are usually mutually exclusive, legal references can sometimes belong to multiple categories.

The domain of application of the requirements within the company, includes, but is not limited to the following: preservation in the context of legal holds related to E-Discovery; retention both in term of regulatory requirements and internal business requirements; and data privacy, or personal data protection, security, or enforcement of confidentiality and security regulation, or business driven confidentiality and security requirements such as trade secrets. Note that a legal reference can very well define requirements for multiple domains of application.

The level of risk is associated with non compliance. While some regulations have existed for a long time, they may never have been enforced in practice. Other regulations are regularly and aggressively enforced, with certain agencies being especially proactive with regard to using the full extent of the law and with generating strong negative public relations (PR) for violators.

Other classifications arise that are related to the originator of the requirements, or the requirements themselves and provide useful context in their use within the company. These other classifications may be specific to the business of the company, for example: A large government contractor may pay special attention to government contractor regulations and be interested in culling out all legal references related to this topic Classification tags make it much easier and simpler for end users to narrow down their search when looking for applicable requirements within a certain context. They help simplify and humanize often complex legal numbering schemas and languages. They can also be used to perform consistency checks and to automatically flag potential errors.

Requirement definitions, broken down in specific categories, include but are not limited to: Retention rules include any rules related to when and under which condition the relevant information should be disposed of, or how long and under which condition it should be maintained. Such retention rules may vary based on the type of document considered, in the sense of official records, versus draft or courtesy copy.

Disposal protocols specify how the information should be disposed of when its retention period expires, includes the means for and the thoroughness of a destruction process, details process steps in the case of a multi-step disposal process, security, audit and confidentiality requirement in the handling of the disposal process, etc. Handling protocols specify who can access or use the information for what purpose, using an Access Control List or other access control processes, or Security Level Classifications, etc. Storage protocols specify any restrictions on where and how the information should be stored, encryption requirements, etc. Transport protocols specify any process requirements on how to move or copy the data between different storage systems.

It is to the benefit of the company to codify these protocols into a small number of reference protocols, and describe them by reference to a codified version versus including a full description of the protocol potentially different for every legal reference or policy. This codification makes it much easier to interpret the semantic meaning of the requirement automatically and to provide automatic cross-checking and detection of inconsistencies. Codification improves readability for non legal experts. Codification makes it easier to summarize multiple requirements for a single system or class of information. Codification makes it easier to changes the details of one of these protocols consistently independently of which legal references use it. Examples of such codification include retention rules and disposal protocols. Retention rules are defined as sets of a generic rule selected from a list of options (like "permanent", "Fixed time", "Trigger event+fixed time") combined with various parameters as needed (like duration, trigger event). Disposal protocols are defined as a choice form a codified list of applicable options (for example: "Trash", "Shredding", "Shred and burn", etc.).

Related legal references are often defined in the law text themselves. Capturing those related legal references in the LRL module enables: easier and faster cross reference during research; simplification of cross-referencing and cross-inclusion of legal references (with related legal references) when applicable; insuring that all applicable legal references are indeed tracked within the LRL; determination of trumping legal references.

The LRL module 22 also provides full search capabilities leveraging all of the detailed information and context on each legal reference to make it easy for an end user to identify relevant legal references in any given context. Details of the search capabilities correspond to the data model captured above, and leveraging the capability of the HRM module to identify all applicable jurisdictions upstream or downstream from a specific geography, such as, for example, any laws that can apply to any part of Germany, or all laws applying to a specific sub-region of Germany.

Legal Reference to Policy Mapping Module (LRPM)

Figure 4:
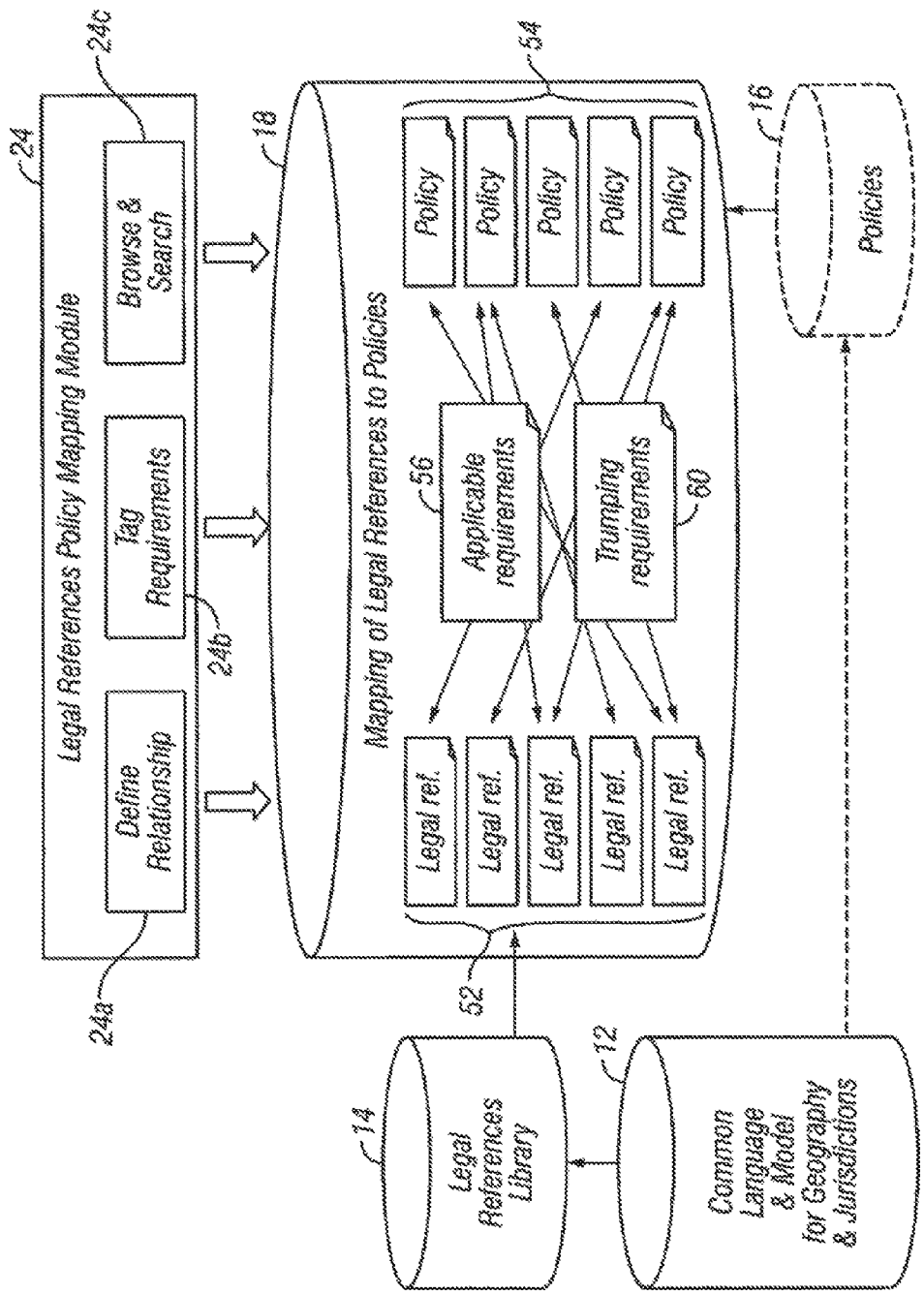
FIG. 4 is a diagram illustrating a legal reference to policy mapping module (LRPM) and its interaction with a module for mapping of legal references to policies.

With reference to FIG. 4, the legal reference to policy mapping module (LRPM) 24 provides several capabilities.

One capability of the LRPM 22 is creation and maintenance 50 of the list of legal references 52 that apply to any given policy 54. In order to identify which legal references may be relevant to which policy, the user will typically leverage multiple sources, including but not limited to: known relevant legal references already attached to similar policy, or same policy as globally defined within a larger jurisdiction (like a global policy for the US, compared to a local policy for just California); potentially relevant policy identified as the result of research using the full search capability of the LRL module, as described above; and legal references related to legal references already attached to a policy, as defined by the LRL module.

Another capability of the LRPM 22 is to identify 56 which type of requirement for a given policy may be influenced by a given legal reference. This is directly aligned with the requirement categorization used by the LRL module, including but not limited to: retention rules; disposal protocols; handling protocols; storage protocols; and transport protocols. This type of mapping is established in different ways, including but not limited to the following: Automatic mapping that is based on which requirements were defined or not defined in the LRL module for that legal reference. Automatic mapping that is based on which classification tags 58 were defined for that legal reference in the LRL module (a retention tagged legal reference should impact retention rules; a privacy tagged legal reference should impact handling and storage protocols, etc.); Explicit mapping by the user, who will designate which of the requirement categories of the policy will be impacted by the given legal reference, including the ability to overwrite the automated mapping described above.

Another capability of the LRPM 22 is to define which of the legal references and optionally, which of their requirements, are considered "controlling" for that policy. This sets the expectation that the requirements defined in the policy should be guided by the controlling legal references, even if some of the other applicable requirements may be even stricter or not really compatible with them. This is especially useful as while policymaker wants to keep track of all legal references that could apply to a given policy, they will often need to make some compromise on how they interpret the sum of these requirements. For example, this is the case where requirements: are stricter than should reasonably need to be followed; apply within a geography or jurisdiction where the activity (and consequently the exposure) of the company is very limited; have never been enforced by their governing body or agency in the past; or are conflicting with other requirements for which the risk is much greater.

By aggregating in a highly structured form a clear definition of the relationships and priorities of the different requirements of different legal references, as they apply to a given policy, the LRPM module 24 provides the very foundation that will enable the RCC module to perform its function; enables the policy makers to clearly document the decisions and compromises made during the process of determining the policy requirements; makes it much easier to defend that process if challenged later; and makes it much easier to maintain that process accurately as legal references and business context continue to evolve over time.

Requirement Cross Check Module (RCC)

Figure 5:
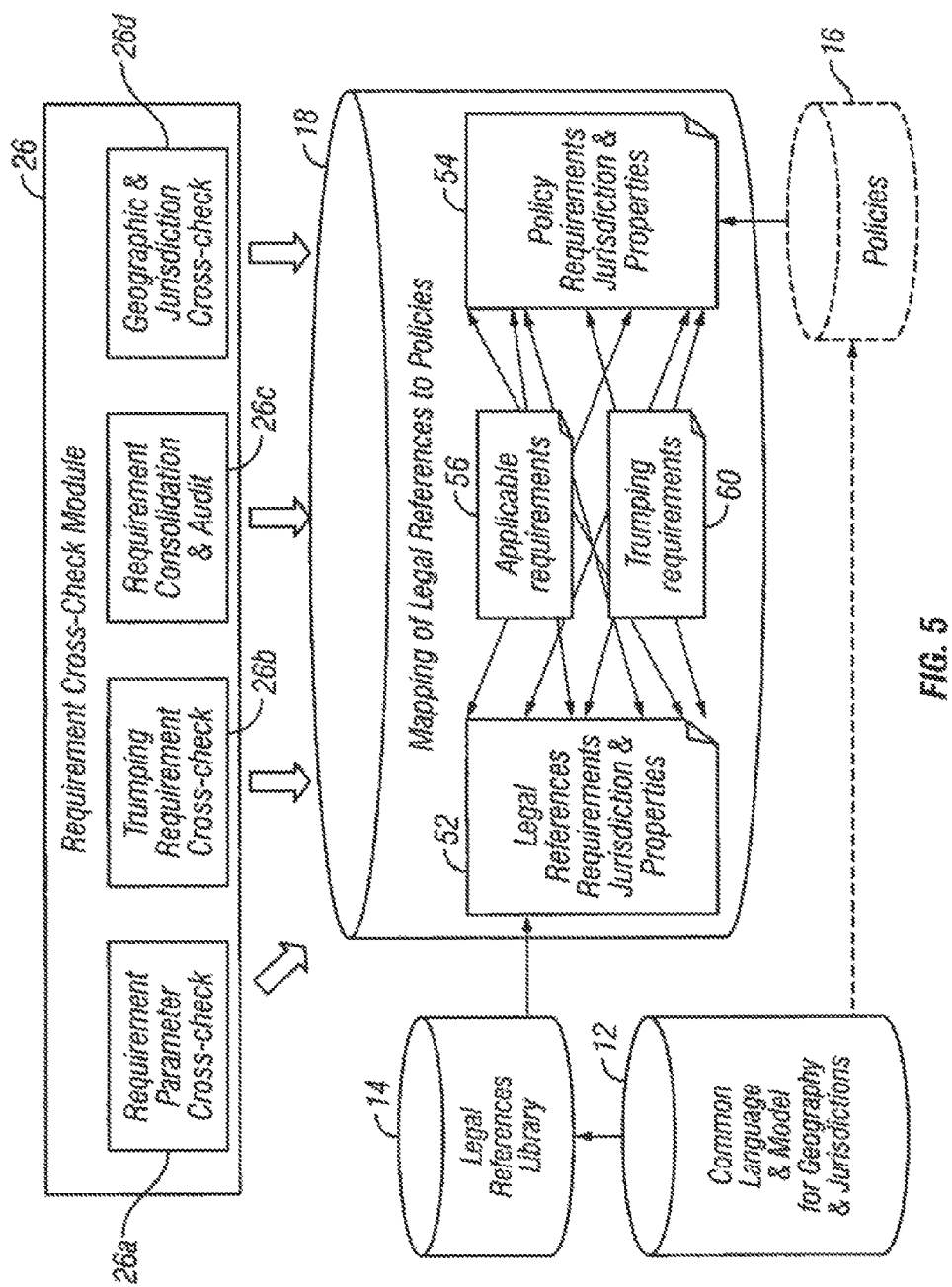
FIG. 5 is a diagram illustrating a requirement cross check module (RCC) and it interaction with the module for mapping of legal references to policies.

With reference to FIG. 5, the requirement cross check module (RCC) module 26 includes a requirement parameter cross-check function 26a, a trumping requirements cross-check function 26b, a requirement consolidation and audit function 26c, and a geographic and cross-check function 26d. The requirement cross check (RCC) module 26 provides several capabilities.

One capability is to create and maintain a model of the dependencies and compatibility between the structured parameters 44 used to describe each category of requirements. An illustrative examples of this includes the disposal protocol requirements for ESI (Electronically Stored Information) may specify 3 options, including simple deletion; digital shredding; and physical destruction of the storage medium. The 3 options can clearly be ordered by increasing levels of enforcement, in the sense that any requirement for simple deletion or digital shredding would be implicitly fulfilled through physical destruction of the storage medium. The ability to represent and understand this order of prevalence between options is key for the RCC module to process the semantic meaning of the requirements, and insure consistency and compliance.

Another capability, as described above, is that a retention rule may be defined as sets of a generic rule selected from a list of options (like "permanent", "Fixed time", "Trigger event+fixed time") combined with various parameters as needed (like duration, trigger event). The ability to understand any implication or inclusion between trigger events (in the sense that occurrence of event A implies that event B already occurred), ability to compared different periods and how to combine those and compare them based on which generic rule applies, would allow the RCC module to compare different retention rules from various legal references and conclude if they appear indeed compatible or not with the resulting policy retention rules.

Within each category of requirements, the RCC module 26 consolidates all controlling requirements 60 and compares them to the policy requirement, using the above defined understanding of relationship between the parameters and options. This may be done in a fully automated way (when full semantic interpretation of the requirement description can be performed, like comparing different retention periods) or in a semi-automated way. For example, the RCC module may compare the trigger events of retention rules and may not be able to compare them to the policy trigger event. In such case, the RCC module may trigger a workflow for an authorized user to review the conflicting requirement parameters and provide legal interpretation, to close the cross-check on trigger further corrective action.

Within each category of requirement, the RCC module 26 also consolidates 54 the sum of all requirements (not just the controlling ones) to allow easy review and evaluation of the compromise that were made between the policy requirement and the sum of all requirements that were applicable in that context.

Cross-check the geographic region and jurisdiction 52 associated to the policy and its related legal references to detect inconsistency that could uncover human errors.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

The invention claimed is:

1. A computer-implemented system for defining and justifying policy requirements, comprising:
   a hierarchical regional mapping (HRM) module that provides:
      a common language, common among geography and different jurisdictions, and a hierarchical model applied to both said geography and different jurisdictions,
      representation of the different jurisdictions and sub-jurisdictions thereof that an organization operates in and representation of regulatory or governing bodies within the different jurisdictions, and
      an explicit naming/referencing scheme in which nodes are specified by a hierarchical path of said hierarchical model, wherein each node is named or referenced as a unique node by specifying a complete hierarchical path that starts with a country, or a geographical region or jurisdiction equivalent to a union of multiple countries;
   a legal references library (LRL) module that contains applicable legal references;
   a legal references policy mapping (LRPM) module that maps legal references to policies; and
   a requirements cross-checking (RCC) module that cross-checks information in the legal references policy mapping module.

2. The system of claim 1 wherein the legal references policy mapping (LRPM) module provides for creating and maintaining a list of legal references that apply to a given policy.

3. The system of claim 1 wherein the legal references policy mapping (LRPM) module provides for identifying which type of requirement for a given policy is influenced by a given legal references.

4. The system of claim 1 wherein the legal references policy mapping (LRPM) module provides which of the legal references are to be controlling for a given policy.

5. The system of claim 1 wherein the requirements cross-checking (RCC) module provides for creating and maintaining a model of the dependencies and compatibility between structured parameters used to describe each category of requirements.

6. The system of claim 1 wherein the requirements cross-checking (RCC) module provides, within each category of requirements, consolidation of controlling requirements and comparison of said controlling requirements to a policy requirement using an understanding of the relationships between parameters and options.

7. The system of claim 1 wherein the requirements cross-checking (RCC) module provides, within each category of requirements, consolidation of the sum of all requirements to allow easy review and evaluation of the compromises that were made between the policy requirement and the sum of all requirements that were applicable.

8. The system of claim 1 wherein the requirements cross-checking (RCC) module provides cross-checking of a geographic region and jurisdiction associated with a policy and its related legal references to detect inconsistency that would uncover human error.

9. The system of claim 1 wherein the legal references library (LRL) module provides for each legal reference a geographic region or jurisdiction that the reference applies to as defined by one or more nodes within a hierarchy defined by the HRM module.

10. The system of claim 9 wherein the legal references library (LRL) module provides for each reference a classification tag that reflects the source of a requirement and the domain of application of the requirements within the organization.

11. The system of claim 10 wherein the domain of application includes one or more of the following: preservation requirements, retention, data privacy or security designations.

12. The system of claim 10 wherein the domain of application includes a level of risk associated with non-compliance.

13. The system of claim 10 wherein a requirements definition includes one or more of the following: retention rules, disposal protocols, handling protocols, storage protocols, and transport protocols.

14. The system of claim 9 wherein the legal references library (LRL) module includes referral to related legal references.

15. The system of claim 1 wherein the legal references library (LRL) module is provided with full search capability.

16. A computer-implemented method for defining and justifying policy requirements, comprising the steps of:
- mapping in a hierarchical regional mapping (HRM) module wherein said HRM provides:
  - a common language, common among geography and different jurisdictions, and a hierarchical model applied to both said geography and different jurisdictions,
  - representation of the different jurisdictions and sub-jurisdictions thereof that an organization operates in and representation of regulatory or governing bodies within the different jurisdictions, and
  - an explicit naming/referencing scheme in which nodes are specified by a hierarchical path of said hierarchical model, wherein each node is named or referenced as a unique node by specifying a complete hierarchical path that starts with a country, or a geographical region or jurisdiction equivalent to a union of multiple countries;
- providing legal references library (LRL) module that contains applicable legal references;
- mapping legal references to policies in a legal references policy mapping (LRPM) module; and
- cross-checking in a requirements cross-checking (RCC) module information in the legal references policy mapping module.

\* \* \* \* \*